(12) United States Patent
Enokida

(10) Patent No.: US 6,473,526 B1
(45) Date of Patent: Oct. 29, 2002

(54) IMAGE PROCESSING SYSTEM AND CONTROL METHOD OF THE SAME, IMAGE PROCESSING APPARATUS AND CONTROL METHOD OF THE SAME, AND COMPUTER READABLE MEMORY

(75) Inventor: Miyuki Enokida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/127,978

(22) Filed: Aug. 3, 1998

(30) Foreign Application Priority Data

Aug. 20, 1997 (JP) .............................. 9-223988
Sep. 22, 1997 (JP) .............................. 9-256709
Jun. 29, 1998 (JP) ............................ 10-183032

(51) Int. Cl.[7] .............................. G06K 9/36; G06K 9/46
(52) U.S. Cl. ...................... 382/232; 382/233; 382/240
(58) Field of Search ................................. 382/232, 233, 382/240, 299; 358/426, 426.01; 707/101, 104

(56) References Cited

U.S. PATENT DOCUMENTS 5,521,717 A  *  5/1996  Maeda ........................ 356/426
5,760,847 A       6/1998  Enokida ...................... 348/700
5,911,010 A  *  6/1999  Nakajima .................... 382/239
6,006,231 A  * 12/1999  Popa ........................... 707/101

* cited by examiner

*Primary Examiner*—Phuoc Tran
(74) *Attorney, Agent, or Firm*—Fitzpatrick, Cella, Harper & Scinto

(57) ABSTRACT

In an image processing apparatus for managing hierarchical encoded image data by using a server/client system, a server machine transmits encoded image data in one layer designated in units of layers from hierarchical encoded image data to a client machine through a network. The client machine receives the encoded image data transmitted in units of layers from the server machine through the network. The received encoded image data in each layer is reconstructed into one hierarchical encoded image data. That is, latest received encoded image data is stored while converting the latest received encoded image data into one hierarchical encoded image data by combining the latest received encoded image data with previously received encoded image data.

17 Claims, 17 Drawing Sheets

FIG. 3
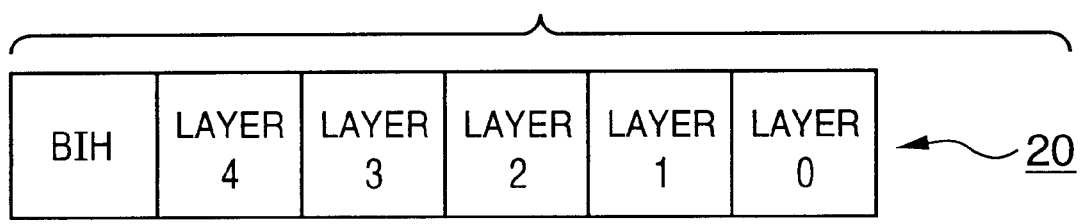
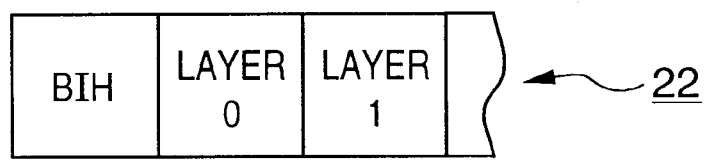

FIG. 4

```
JBIGIMGS
    +--FILE1.JBG
    +--FILE2.JBG
    +--FILE3.JBG
    +--FILE4.JBG
```

FIG. 5

| DL | D | P | | Xd | Yd | Lo | Mx | My | ORDER | OPTIONS |
|----|---|---|---|----|----|----|----|----|-------|---------|
| 0  | 4 | 1 | | 4752 | 3360 | 2 | 8 | 8 | 08H | 7cH |

~40

| DL | D | P | | Xd | Yd | Lo | Mx | My | ORDER | OPTIONS |
|----|---|---|---|----|----|----|----|----|-------|---------|
| 0  | 0 | 1 | | 297 | 210 | 2 | 8 | 8 | 0 | 7cH |
| 1  | 1 | 1 | | 594 | 420 | 2 | 8 | 8 | 0 | 7cH |

~41
~42

| DL | D | P | | Xd | Yd | Lo | Mx | My | ORDER | OPTIONS |
|----|---|---|---|----|----|----|----|----|-------|---------|
| 0  | 1 | 1 | | 594 | 420 | 2 | 8 | 8 | 0 | 7cH |

| LAYER 0<br>1K BYTES | LAYER 1<br>1.5K<br>BYTES | LAYER 2<br>2K BYTES | LAYER 3<br>3K BYTES | LAYER 4<br>10K BYTES |

FIG. 17

| SCAN 1<br>3072 BYTES | SCAN 2<br>512 BYTES | SCAN 3<br>2048 BYTES | SCAN 4<br>2560 BYTES | SCAN 5<br>1024 BYTES |
|---|---|---|---|---|

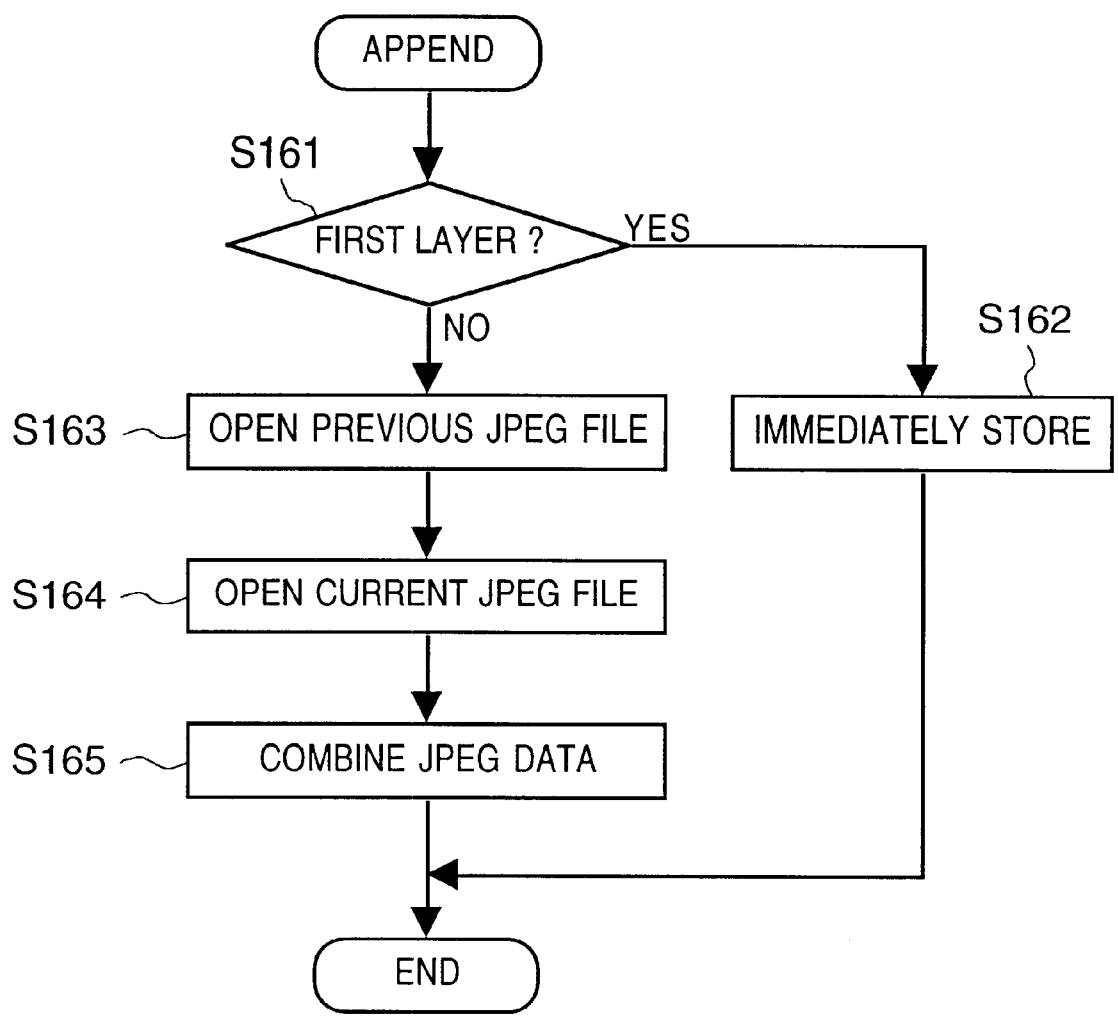

IMAGE PROCESSING SYSTEM AND CONTROL METHOD OF THE SAME, IMAGE PROCESSING APPARATUS AND CONTROL METHOD OF THE SAME, AND COMPUTER READABLE MEMORY

BACKGROUND OF THE INVENTION

1. Field of the Invention

The present invention relates to an image processing system comprising a server machine for managing hierarchical encoded image data, a client machine for decoding and displaying the hierarchical encoded image data, and a network for connecting the server machine and the client machine and a control method of the system, an image processing apparatus and a control method of the apparatus, and a computer readable memory.

2. Description of the Related Art

In a conventional image processing system for exchanging hierarchical encoded image data between a server machine and a client machine through a network, the server machine transfers encoded image data in all layers of hierarchical encoded image data requested by the client machine in accordance with one transfer request.

In separately transferring hierarchical encoded image data a plurality of times, the hierarchical encoded image data is divided and transferred in predetermined units.

Additionally, when the client machine needs to use once transferred hierarchical encoded image data like a data cache, an image of the transferred hierarchical encoded image data is stored in a file as a temporary file without changing the format of the image.

In the above conventional image processing system, the encoded image data in all layers of requested hierarchical encoded image data is transmitted in accordance with one transfer request from the client machine to the server machine. Therefore, when hierarchical encoded image data encoded by a hierarchical coding method such as a JBIG coding method or a JPEG progressive coding method is used, even encoded image data in layers not used in display is transferred to the client machine. This increases the traffic of the network connecting the server machine and the client machine and also prolongs the time required for transfer.

In the JBIG coding method, JBIG-encoded hierarchical image data is necessarily decoded in order from encoded image data in a lowest-resolution layer. However, encoded image data constituted by a HITOLO format (constituted in order from encoded image data in a highest-resolution layer to encoded image data in a lowest-resolution layer) is transferred in this order from the server machine to the client machine. Therefore, the client machine must start decoding an encoded image in the lowest-resolution layer stored in the end of the encoded image data. This complicates the decoding process.

Also, in divisionally transferring hierarchical encoded image data in predetermined units, data is transferred in fixed units regardless of the transfer capacity or the use conditions of the network. Therefore, only a very small amount of data is sometimes transferred although the network in use is not frequently used. Conversely, a large amount of data is sometimes transferred when the network is busy. In either case, the network cannot be efficiently used.

Furthermore, when the client machine has a function of storing once transferred hierarchical encoded image data in a temporary area like a data cache, an image of the transferred encoded image data is immediately stored. When only encoded image data in a certain layer of hierarchical encoded image data is transferred, an image of the divisionally transferred encoded image data is immediately stored in the data cache. Therefore, even when the encoded image data is again decoded, the same complicated process as in the first time must be performed.

Additionally, to directly read out and decode each divided encoded image data in this data cache, dedicated decode/display application software is necessary. This lowers the versatility of the system.

SUMMARY OF THE INVENTION

The present invention has been made in consideration of the above problems, and has as its object to provide, in an image processing apparatus for managing hierarchical encoded image data by using a server/client system, an image processing system capable of efficiently exchanging hierarchical encoded image data between a server machine and a client machine and rapidly decoding and displaying encoded image data received by the client machine and a control method of the system, an image processing apparatus and a control method of the apparatus, and a computer readable memory.

To achieve the above object, an image processing system according to the present invention has the following arrangement.

An image processing system comprises a server machine for managing hierarchical encoded image data, a client machine for decoding and displaying the hierarchical encoded image data, and a network for connecting the server machine and the client machine, the server machine comprising transmitting means for transmitting encoded image data in one layer designated in units of layers from the hierarchical encoded image data to the client machine through the network, the client machine comprising receiving means for receiving encoded image data transmitted in units of layers from the server machine through the network, and reconstructing means for reconstructing the encoded image data in each layer received by the receiving means into one hierarchical encoded image data, and the reconstructing means storing latest encoded image data received by the receiving means while converting the latest encoded image data into one hierarchical encoded image data by combining the latest encoded image data with previously received encoded image data.

To achieve the above object, a method of controlling an image processing system according to the present invention has the following arrangement.

A method of controlling an image processing system comprising a server machine for managing hierarchical encoded image data, a client machine for decoding and displaying the hierarchical encoded image data, and a network for connecting the server machine and the client machine comprises the transmission step of transmitting encoded image data in one layer designated in units of layers from the hierarchical encoded image data from the server machine to the client machine through the network, the reception step of allowing the client machine to receive encoded image data transmitted in units of layers from the server machine through the network, and the reconstruction step of reconstructing the encoded image data in each layer received in the reception step into one hierarchical encoded image data, wherein the reconstruction step stores latest encoded image data received in the reception step while converting the latest encoded image data into one hierarchical encoded image data by combining the latest encoded image data with previously received encoded image data.

To achieve the above object, a computer readable memory according to the present invention has the following arrangement.

A computer readable memory storing program codes for controlling an image processing system comprising a server machine for managing hierarchical encoded image data, a client machine for decoding and displaying the hierarchical encoded image data, and a network for connecting the server machine and the client machine comprises a program code of the transmission step of transmitting encoded-image data in one layer designated in units of layers from the hierarchical encoded image data from the server machine to the client machine through the network, a program code of the reception step of allowing the client machine to receive encoded image data transmitted in units of layers from the server machine through the network, and a program code of the reconstruction step of reconstructing the encoded image data in each layer received in the reception step into one hierarchical encoded image data, wherein the reconstruction step stores latest encoded image data received in the reception step while converting the latest encoded image data into one hierarchical encoded image data by combining the latest encoded image data with previously received encoded image data.

To achieve the above object, an image processing apparatus according to the present invention has the following arrangement.

An image processing apparatus which manages hierarchical encoded image data and is connected to a client machine for decoding and displaying the hierarchical encoded image data through a network, comprises receiving means for receiving, from the client machine, designation of a layer of hierarchical encoded image data as an object of transmission, and transmitting means for transmitting, to the client machine through the network, encoded image data in one layer designated in units of layers from the hierarchical encoded image data received by the receiving means.

To achieve the above object, an image processing apparatus according to the present invention has the following arrangement.

An image processing apparatus which is connected to a server machine for managing hierarchical encoded image data through a network and decodes and displays the hierarchical encoded image data, comprises receiving means for receiving encoded image data transmitted in units of layers from the server machine through the network, and reconstructing means for reconstructing the encoded image data in each layer received by the receiving means into one hierarchical encoded image data, wherein the reconstructing means stores latest encoded image data received by the receiving means while converting the latest encoded image data into one hierarchical encoded image data by combining the latest encoded image data with previously received encoded image data.

To achieve the above object, a method of controlling an image processing apparatus according to the present invention has the following arrangement.

A method of controlling an image processing apparatus which manages hierarchical encoded image data and is connected to a client machine for decoding and displaying the hierarchical encoded image data through a network, comprises the reception step of receiving, from the client machine, designation of a layer of hierarchical encoded image data as an object of transmission, and the transmission step of transmitting, to the client machine through the network, encoded image data in one layer designated in units of layers from the hierarchical encoded image data received in the reception step.

To achieve the above object, a method of controlling an image processing apparatus according to the present invention has the following arrangement.

A method of controlling an image processing apparatus which is connected to a server machine for managing hierarchical encoded image data through a network and decodes and displays the hierarchical encoded image data, comprises the reception step of receiving encoded image data transmitted in units of layers from the server machine through the network, and the reconstruction step of reconstructing the encoded image data in each layer received in the reception step into one hierarchical encoded image data, wherein the reconstruction step stores latest encoded image data received in the reception step while converting the latest encoded image data into one hierarchical encoded image data by combining the latest encoded image data with previously received encoded image data.

To achieve the above object, a computer readable memory according to the present invention has the following arrangement.

A computer readable memory storing program codes for controlling an image processing apparatus which manages hierarchical encoded image data and is connected to a client machine for decoding and displaying the hierarchical encoded image data through a network, comprises a program code of the reception step of receiving, from the client machine, designation of a layer of hierarchical encoded image data as an object of transmission, and a program code of the transmission step of transmitting, to the client machine through the network, encoded image data in one layer designated in units of layers from the hierarchical encoded image data received in the reception step.

To achieve the above object, a computer readable memory according to the present invention has the following arrangement.

A computer readable memory storing program codes for controlling an image processing apparatus which is connected to a server machine for managing hierarchical encoded image data through a network and decodes and displays the hierarchical encoded image data, comprises a program code of the reception step of receiving encoded image data transmitted in units of layers from the server machine through the network, and a program code of the reconstruction step of reconstructing the encoded image data in each layer received in the reception step into one hierarchical encoded image data, wherein the reconstruction step stores latest encoded image data received in the reception step while converting the latest encoded image data into one hierarchical encoded image data by combining the latest encoded image data with previously received encoded image data.

To achieve the above object, an image processing system according to the present invention has the following arrangement.

An image processing system comprising a server machine for managing hierarchical encoded image data, a client machine for decoding and displaying the hierarchical encoded image data, and a network for connecting the server machine and the client machine, comprises designating means for designating a layer of hierarchical encoded image data as an object of transmission to the server machine, determining means for determining encoded image data in one or more layers, including the layer designated by the designating means, to be transmitted to the client machine in one data transfer in the network having a data transfer unit with a predetermined amount, transmitting means for transmitting the encoded image data in one or more layers including the designated layer determined by the determining means to the client machine, and reconstructing means for reconstructing the encoded image data in one or more layers including the designated layer transmitted from the transmitting means on the basis of resolution of the encoded image data.

To achieve the above object, a method of controlling an image processing system according to the present invention has the following arrangement.

A method of controlling an image processing system comprising a server machine for managing hierarchical encoded image data, a client machine for decoding and displaying the hierarchical encoded image data, and a network for connecting the server machine and the client machine, comprises the designation step of designating a layer of hierarchical encoded image data as an object of transmission to the server machine, the determination step of determining encoded image data in one or more layers, including the layer designated in the designation step, to be transmitted to the client machine in one data transfer in the network having a data transfer unit with a predetermined amount, the transmission step of transmitting the encoded image data in one or more layers including the designated layer determined in the determination step to the client machine, and the reconstruction step of reconstructing the encoded image data in one or more layers including the designated layer transmitted in the transmission step on the basis of resolution of the encoded image data.

To achieve the above object, a computer readable memory according to the present invention has the following arrangement.

A computer readable memory storing program codes for controlling an image processing system comprising a server machine for managing hierarchical encoded image data, a client machine for decoding and displaying the hierarchical encoded image data, and a network for connecting the server machine and the client machine, comprises a program code of the designation step of designating a layer of hierarchical encoded image data as an object of transmission to the server machine, a program code of the determination step of determining encoded image data in one or more layers, including the layer designated in the designation step, to be transmitted to the client machine in one data transfer in the network having a data transfer unit with a predetermined amount, a program code of the transmission step of transmitting the encoded image data in one or more layers including the designated layer determined in the determination step to the client machine, and a program code of the reconstruction step of reconstructing the encoded image data in one or more layers including the designated layer transmitted in the transmission step on the basis of resolution of the encoded image data.

To achieve the above object, an image processing apparatus according to the present invention has the following arrangement.

An image processing apparatus for managing hierarchical encoded image data comprises receiving means for receiving a request for transmission of encoded image data in a layer designated by another image processing apparatus connected through a network, determining means for determining encoded image data in one or more layers including the designated layer to be transmitted to this another image processing apparatus in one data transfer in the network having a data transfer unit with a predetermined amount, and transmitting means for transmitting the encoded image data in one or more layers including the designated layer determined by the determining means to this another image processing apparatus.

To achieve the above object, a method of controlling an image processing apparatus according to the present invention has the following arrangement.

A method of controlling an image processing apparatus for managing hierarchical encoded image data comprises the reception step of receiving a request for transmission of encoded image data in a layer designated by another image processing apparatus connected through a network, the determination step of determining encoded image data in one or more layers including the designated layer to be transmitted to this another image processing apparatus in one data transfer in the network having a data transfer unit with a predetermined amount, and a transmission step of transmitting the encoded image data in one or more layers including the designated layer determined in the determination step to this another image processing apparatus.

To achieve the above object, an image processing apparatus according to the present invention has the following arrangement.

An image processing apparatus connected to a first image processing apparatus for managing hierarchical encoded image data through a network, comprises designating means for designating a layer of hierarchical encoded image data as an object of transmission to the first image processing apparatus, receiving means for receiving, from the first image processing apparatus, encoded image data in one or more layers, determined on the basis of the layer designated by the designating means and including the designated layer, in one data transfer in the network having a data transfer unit with a predetermined amount, and reconstructing means for reconstructing the encoded image data in one or more layers including the designated layer received by the receiving means on the basis of resolution of the encoded image data.

To achieve the above object, a method of controlling an image processing apparatus according to the present invention has the following arrangement.

A method of controlling an image processing apparatus connected to a first image processing apparatus for managing hierarchical encoded image data through a network, comprises the designation step of designating a layer of hierarchical encoded image data as an object of transmission to the first image processing apparatus, the reception step of receiving, from the first image processing apparatus, encoded image data in one or more layers, determined on the basis of the layer designated in the designation step and including the designated layer, in one data transfer in the network having a data transfer unit with a predetermined amount, and the reconstruction step of reconstructing the encoded image data in one or more layers including the designated layer received in the reception step on the basis of resolution of the encoded image data.

To achieve the above object, a computer readable memory according to the present invention has the following arrangement.

A computer readable memory storing program codes for controlling an image processing apparatus for managing hierarchical encoded image data, comprises a program code of the reception step of receiving a request for transmission of encoded image data in a layer designated by another image processing apparatus connected through a network, a program code of the determination step of determining encoded image data in one or more layers including the designated layer to be transmitted to this another image processing apparatus in one data transfer in the network having a data transfer unit with a predetermined amount, and a program code of the transmission step of transmitting the encoded image data in one or more layers including the designated layer determined in the determination step to this another image processing apparatus.

To achieve the above object, a computer readable memory according to the present invention has the following arrangement.

A computer readable memory storing program codes for controlling an image processing apparatus connected to a first image processing apparatus for managing hierarchical encoded image data through a network, comprises a program code of the designation step of designating a layer of hierarchical encoded image data as an object of transmission to the first image processing apparatus, a program code of the reception step of receiving, from the first image processing apparatus, encoded image data in one or more layers, determined on the basis of the layer designated in the designation step and including the designated layer, in one data transfer in the network having a data transfer unit with a predetermined amount, and a program code of the reconstruction step of reconstructing the encoded image data in one or more layers including the designated layer received in the reception step on the basis of resolution of the encoded image data.

The present invention described above can provide, in an image processing apparatus for managing hierarchical encoded image data by using a server/client system, an image processing system capable of efficiently exchanging hierarchical encoded image data between a server machine and a client machine and rapidly decoding and displaying encoded image data received by the client machine and a control method of the system, an image processing apparatus and a control method of the apparatus, and a computer readable memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing the data formats of JBIG files stored in the server machine in the first embodiment of the present invention;

FIG. 4 is a view showing examples of JBIG files in the first embodiment of the present invention;

FIG. 5 is a view showing examples of BIHs in the first embodiment of the present invention;

FIG. 11 is a view showing examples of the numbers of bytes of JBIG data in individual layers of a JBIG file in the second embodiment of the present invention;

FIG. 17 is a view showing examples of the numbers of bytes of JPEG data in individual layers of a JPEG file in the fifth embodiment of the present invention; and FIG. 18 is a flow chart showing a process executed by a client machine in the fifth embodiment of the present invention.

DETAILED DESCRIPTION OF THE PREFERRED EMBODIMENTS

Preferred embodiments of the present invention will be described in detail below with reference to the accompanying drawings.

<First Embodiment>

Figure 1:
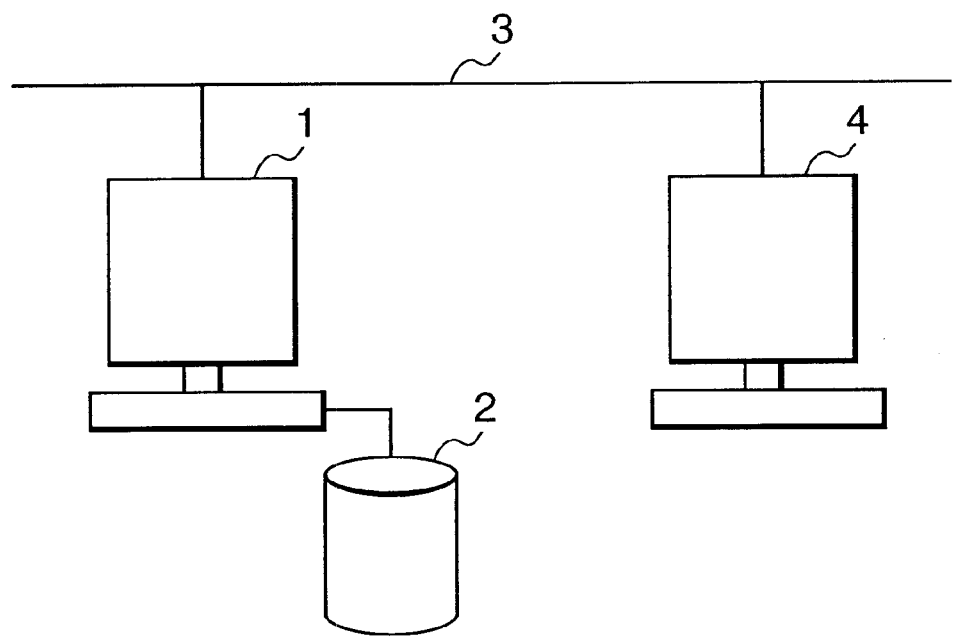
FIG. 1 is a view showing an outline of the arrangement of an image processing system according to the first embodiment of the present invention.

FIG. 1 is a view showing an outline of the arrangement of an image processing system according to the first embodiment of the present invention.

In FIG. 1, reference numeral 1 denotes a terminal which stores a large amount of JBIG-encoded image data (to be referred to as a JBIG file hereinafter) and functions as a server machine; 2, a magnetic disk unit for actually storing and managing these JBIG files; 4, a terminal which functions as a client machine with respect to the server machine 1; and 3, a network connecting the server machine 1 and the client machine 4.

The configuration (arithmetic unit) of the server machine 1 and the client machine 4 will be described below with reference to FIG. 2.

Figure 2:
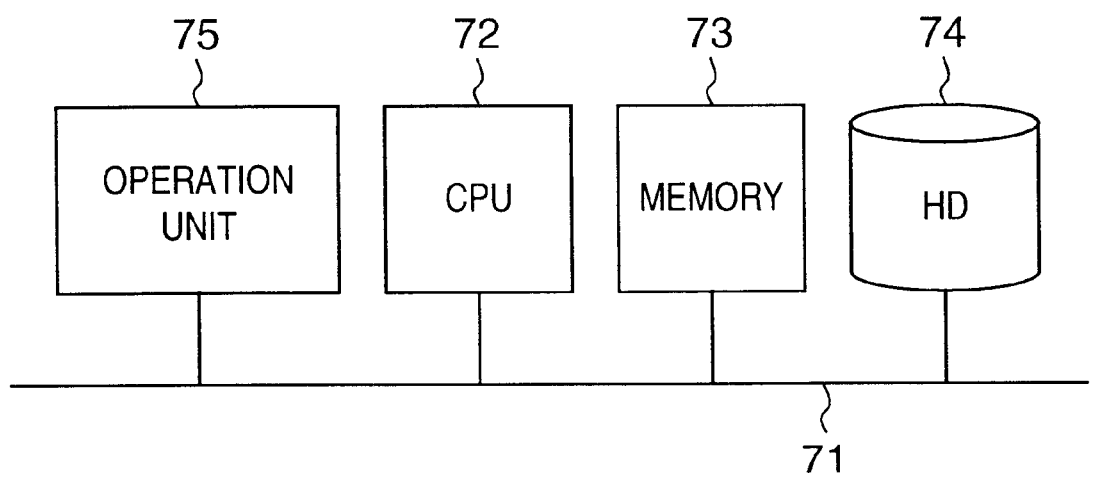
FIG. 2 is a view showing the arrangement of an arithmetic unit of a server machine and a client machine in the first embodiment of the present invention.

In the first embodiment, it is assumed that both the server machine 1 and the client machine 4 have as their basic arrangement the arrangement shown in FIG. 2 for simplicity. However, each machine can naturally have other various arrangements.

FIG. 2 is a view showing the arrangement of an arithmetic unit of the server machine and the client machine in the first embodiment of the present invention.

In FIG. 2, reference numeral 71 denotes a bus for sconnecting individual components; 72, a CPU for actually performing arithmetic operations; and 73, a memory for storing programs which the CPU 72 uses to execute arithmetic operations and flow charts (to be described later). The memory 73 also functions as a temporary work memory. Reference numeral 74 denotes a disk unit for storing programs and image data; and 75, an operation unit including a keyboard, a mouse, and the like.

In the following description, flow charts are executed by the CPU 72 on the basis of instructions from the memory 73 and the operation unit 75.

In the first embodiment, JBIG files are searched for and displayed on the client machine 4. Briefly, the client machine 4 transmits layer numbers in a necessary JBIG file to the server machine 1. The server machine 1 transmits JBIG data in the designated layers to the client machine 4. Note that the connection form between the server machine 1 and the client machine 4 is not particularly limited.

The data formats of JBIG files stored in the server machine 1 will be described below with reference to FIG. 3.

FIG. 3 is a view showing the data formats of JBIG files stored in the server machine in the first embodiment of the present invention.

FIG. 3 shows three different JBIG files 20, 21, and 22. Each JBIG file has a hierarchical structure. The JBIG file 20 includes a lowest layer (Layer 0) as the lowermost layer and four other layers (Layers 1 to 4). This JBIG file 20 has a HITOLO format in which layers are arranged from a high layer to a low layer.

In the present invention, it is assumed that encoded image data in each layer is called JBIG data and JBIG data in all layers constitutes a JBIG file, for the sake of convenience. The JBIG file 21 includes one layer (Layer X). The JBIG file 22 has a LOTOHI format in which JBIG data are arranged from a low layer to a high layer.

As shown in FIG. 4, these JBIG files are stored in the disk unit 4 or the like by a format "file name.JBG"like "FILE1.JBG", "FILE2.JBG", "FILE3.JBG", or "FILE4.JBG" below a directory "JBIGMGS". The original image size of a JBIG file is, e.g., 4752 pixels*3360 lines. The number of layers is four, and the number of lines per stripe in the lowest layer is two. An Order field is encoded with a HITOLO bit ON. The BIH (Bilevel-Image_Header) of a JBIG file in this case is set as indicated by reference numeral 40 in FIG. 5. In FIG. 5, a DL field indicates a lowest-resolution layer in the JBIG file; a D field, a highest-resolution layer in the JBIG file; a P field, the number of bit planes ("1" in a binary case); an Xd field and a Yd field, horizontal and vertical sizes, respectively, at the highest resolution; an L0 field, the number of lines per stripe at the lowest resolution; an Mx field and an My field, permitted maximum horizontal and vertical offsets, respectively, of an AT pixel; an Order field, an order (HITOLO bit) in which stripe data are connected; and an Options field, options.

In the first embodiment, assume for the sake of simplicity of explanation that all JBIG files managed by the server machine 1 are managed by the format indicated by reference numeral 20 in FIG. 3.

An operation by which the client machine 4 searches for and displays a JBIG file in the above environment will be described below. In the following explanation, a JBIG file with a name "JBIGMGS/FILE1.JBG" is hierarchically displayed.

First, the client machine 4 transmits a request for JBIG data in the lowest layer of "JBIGMGS/FILE1.JBG" to the server machine 1. Upon receiving this request for JBIG data in the lowest layer of "JBIGMGS/FILE1.JBG", the server machine 1 forms a transfer JBIG file in accordance with a flow chart shown in FIG. 6 and transmits the file to the client machine 4.

[Process in Server Machine]

Figure 6:
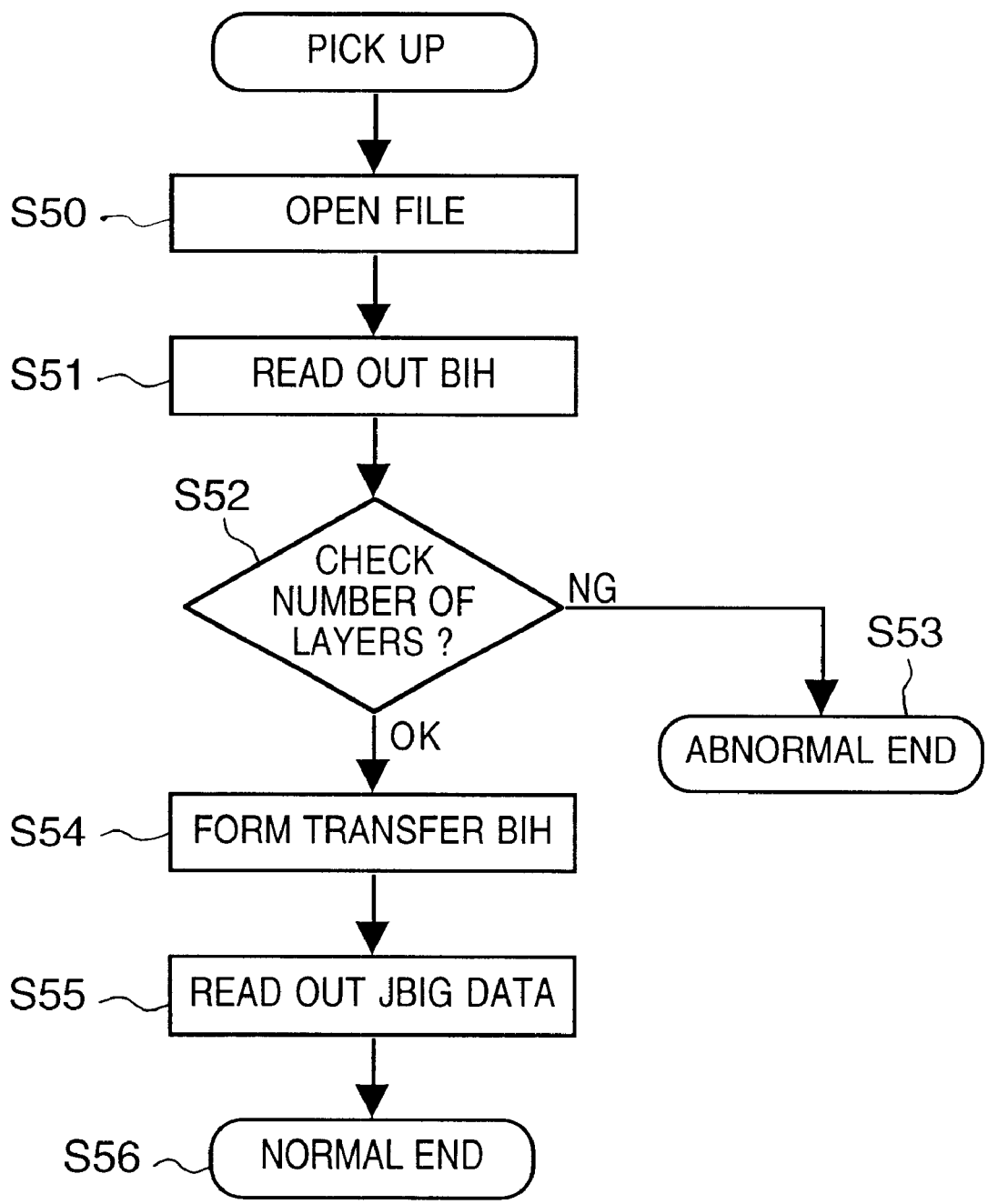
FIG. 6 is a flow chart showing a process executed by the server machine in the first embodiment of the present invention.

FIG. 6 is a flow chart showing the process executed by the server machine 1 in the first embodiment of the present invention.

In step S50, the CPU 72 of the server machine 1 opens a JBIG file with a file name requested by the client machine 4. In this example, the CPU 72 opens a JBIG file with a file name "JBIGMGS/FILE1.JBG". Instep S51, the CPU 72 reads out a BIH stored in the front position of the JBIG file opened in step S50.

In step S52, the CPU 72 checks whether a layer ("0" in this example because the lowest layer is requested) requested by the client machine 4 exists in the JBIG file. This check is error processing. If a layer not existing in the JBIG file is requested, the CPU 72 returns an error message to the client.

If the layer requested by the client machine 4 does not exist in the JBIG file, i.e., if there is an error, the flow advances to step S53, and the CPU 72 returns an error message such as an error code and aborts the process. If the layer requested by the client machine 4 exists in the JBIG file (in a normal case), the flow advances to step S54, and the CPU 72 forms a transfer BIH. Details of this transfer BIH will be described later.

In step S55, the CPU 72 reads out JBIG data in the corresponding layer from the JBIG file. The CPU 72 transmits the transfer BIH formed in step S54 and the readout JBIG data as a transfer JBIG file to the client machine 4 and completes the process in the server machine 1.

Details of the transfer BIH formed in step S54 described above will be described below.

In this first embodiment, the number of layers in the transfer JBIG file is necessarily 1. The contents of the transfer BIH in the lowest layer slightly differ from those in the other layers. In the lowest layer, DL=0 and D=0. In the other layers, DL is a request layer number and D=1. Also, Xd and Yd fields calculate image sizes x and y, respectively, corresponding to the requested layer number in accordance with the original image size as follows.

```
x = Xd in BIH;
y = Yd in BIH;
for (i = 0; i < D in BIH - requested layer number; i ++)
{
x = (x + 1)/2;
y = (y + 1)/2;
}
```

For example, if the original image size is 4752*3360 and the requested layer number is 0, the image sizes x and y are given as 297*210. If the requested layer number is 1, the image sizes x and y are given as 594*420. Also, the HITOLO bit in the Order field is reset to OFF. The original BIH values are copied in other fields.

Following the above procedure, the data format of the transfer JBIG file in the above example is as indicated by reference numeral 21 in FIG. 3. Reference numerals 41 and 42 in FIG. 5 indicate actual values of this transfer BIH in the cases of the lowest layer and the layer 1, respectively.

[Process in Client Machine]

A process in the client machine 4 can be roughly classified into a process of requesting the server machine 1 to transmit a JBIG file, a process of receiving the requested JBIG file, and a process of decoding and displaying the received JBIG file. Of these processes, the process of requesting the server machine 1 to transmit a JBIG file and the process of decoding and displaying the received JBIG file can be accomplished by using known methods, so a detailed description of these processes will be omitted. The process of receiving the JBIG file as the characteristic process of the present invention will be described below with reference to FIG. 7.

Figure 7:
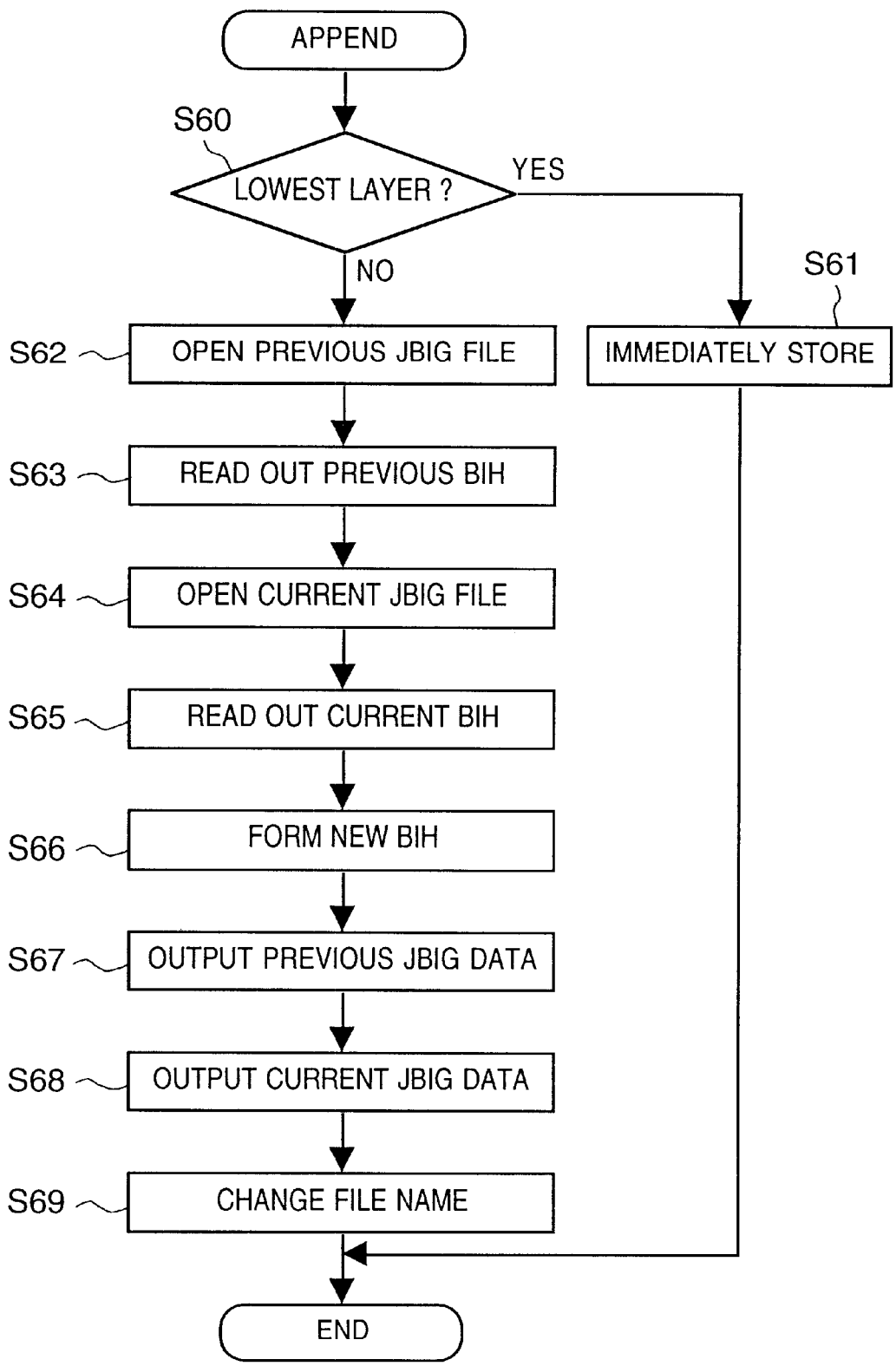
FIG. 7 is a flow chart showing a process executed by the client machine in the first embodiment of the present invention.

FIG. 7 is a flow chart showing the process executed by the client machine in the first embodiment of the present invention.

In step S60, the CPU 72 of the client machine 4 checks whether a JBIG file to be requested this time is the lowest layer. If the JBIG file is the lowest layer (YES in step S60), the flow advances to step S61, and the CPU 72 stores the JBIG file in a directory for managing a temporary file. The storage file name at this time is "A.JBG". If the JBIG file is not the lowest layer (NO in step S60), the flow advances to step S62.

In step S62, the CPU 72 opens a previously stored JBIG file, i.e., the JBIG file with the file name,"A.JBG" in the first embodiment. In step S63, the CPU 72 reads out the BIH of the opened JBIG file. In step S64, the CPU 72 opens a JBIG file, e.g., a JBIG file with a file name "B.JBG", other than the currently transmitted lowest layer. In step S65, the CPU 72 reads out the BIH of this JBIG file.

In step S66, from the BIHs read out in steps S63 and S65, the CPU 72 generates a BIH of a JBIG file (file name "C.JBG") newly constructed from the "A.JBG" JBIG file and the "B.JBG" JBIG file. Details of a method of generating the BIH of this new JBIG file will be described later. In step S67, the CPU 72 reads out the JBIG file with the file name "A.JBG". In step S68, the CPU 72 reads out the JBIG file with the file name "B.JBG". The CPU 72 stores the readout JBIG files in the JBIG file with the file name "C.JBG" by using the LOTOHI format.

To store the readout JBIG files in the JBIG file with the file name "C.JBG" by using the LOTOHI format, it is only necessary to first store the JBIG file with the file name "A.JBG" in the JBIG file with the file name "C.JBG" and then store the JBIG file with the file name "B.JBG".

If all readout JBIG files are stored in the JBIG file with the file name "C.JBG", the flow advances to step S69, and the CPU 72 changes the file name "C.JBG"to the file name "A.JBG". Consequently, the "A.JBG" file is formed as a JBIG file appended with a JBIG file having at least one layer. Simultaneously, the CPU 72 erases the file names "B.JBG" and "C.JBG".

The method of generating a BIH of a JBIG file to be newly constructed described in step S66 will be described in detail below.

Assume, for example, that the BIH of the lowest layer is 41 in FIG. 5 and the BIH of the layer 1 is 42 in FIG. 5. To generate a BIH of a JBIG file to be newly constructed from these two BIHs, the values of the lowest layer are set in the DL, P, L0, Mx, My, Order, and Options fields, a value obtained by adding 1 to the D field of the lowest layer is set in the D field, and the values in the Xd and Yd fields of the layer 1 are set in the Xd and Yd fields, respectively. Consequently, 43 in FIG. 5 is generated as the BIH of the JBIG file to be newly constructed.

The process described above is repeated by the number of layers in the JBIG file managed by the server machine 1. When JBIG data in all layers is received, a complete JBIG file including the JBIG data in all layers can be formed on the client machine 4. Even if only a JBIG file to an intermediate layer is received, this file can be processed as a JBIG file to that layer. The received JBIG file can be displayed by decode/display application software supporting JBIG file display.

In the first embodiment as described above, the server machine 1 processes JBIG data such that only JBIG data in layers requested by the client machine 4 is transferred between the server machine 1 and the client machine 4 through the network 3. Also, the client machine 4 has a function of storing a JBIG file transmitted from the server machine 1 as a temporary file like a data cache. If a currently transferred JBIG file is JBIG data in a lowest-resolution layer, the data is immediately stored in the temporary file. JBIG data in another layer is combined with previously transferred JBIG data, and JBIG data in layers up to that layer is stored as one JBIG file. Since the data are combined by using the LOTOHI format, decoding can be simply performed when this JBIG file is again decoded.

Furthermore, only JBIG data in necessary layers is transferred between the server machine 1 and the client machine 4 and stored by appending the data to a JBIG file previously transferred to a certain area while the data format is changed into a format easily decodable on the client machine 4. Therefore, JBIG data in a certain layer of a JBIG file once received from the server machine 1 can be processed by the client machine 4 by using application software capable of displaying JBIG files. Only when JBIG data in a certain layer of a JBIG file is necessary on the client machine 4, the server machine 1 is requested to transmit the JBIG data in the necessary layer. Consequently, it is possible to minimize the data amount flowing on the network 3 and search for and display images without increasing the traffic of the network 3.

<Second Embodiment>

In the first embodiment, JBIG data is exchanged in units of layers between a server machine 1 and a client machine 4. In the second embodiment, JBIG data in a plurality of layers is exchanged at once in accordance with the data transfer capacity of a network 3.

An outline of a process executed in the second embodiment is as follows. In the environment described above, the client machine 4 searches for and displays a JBIG file. First, the client machine 4 transmits a request for information on a JBIG file with a file name "JBIGIMGS/FILE1.JBG" to the server machine 1. Upon receiving this request, the server machine 1 transmits a total number of layers of the corresponding JBIG file to the client machine 4. On the basis of the transmitted JBIG file information, the client machine 4 manages a file name 90 and a total number 91 of layers of the JBIG file by using a management table shown in FIG. 8. In this embodiment, the file name of the JBIG file is "JBIGIMGS/FILE1.JBG", and the total number of layers is four.

Thereafter, the client machine 4 requests the server machine 1 to transmit a JBIG file in a lowest layer (layer 0). Upon receiving the request, the server machine 1 forms a transfer JBIG file and transmits the formed transfer JBIG file to the client machine 4.

[Process in Server Machine]

Figure 9:
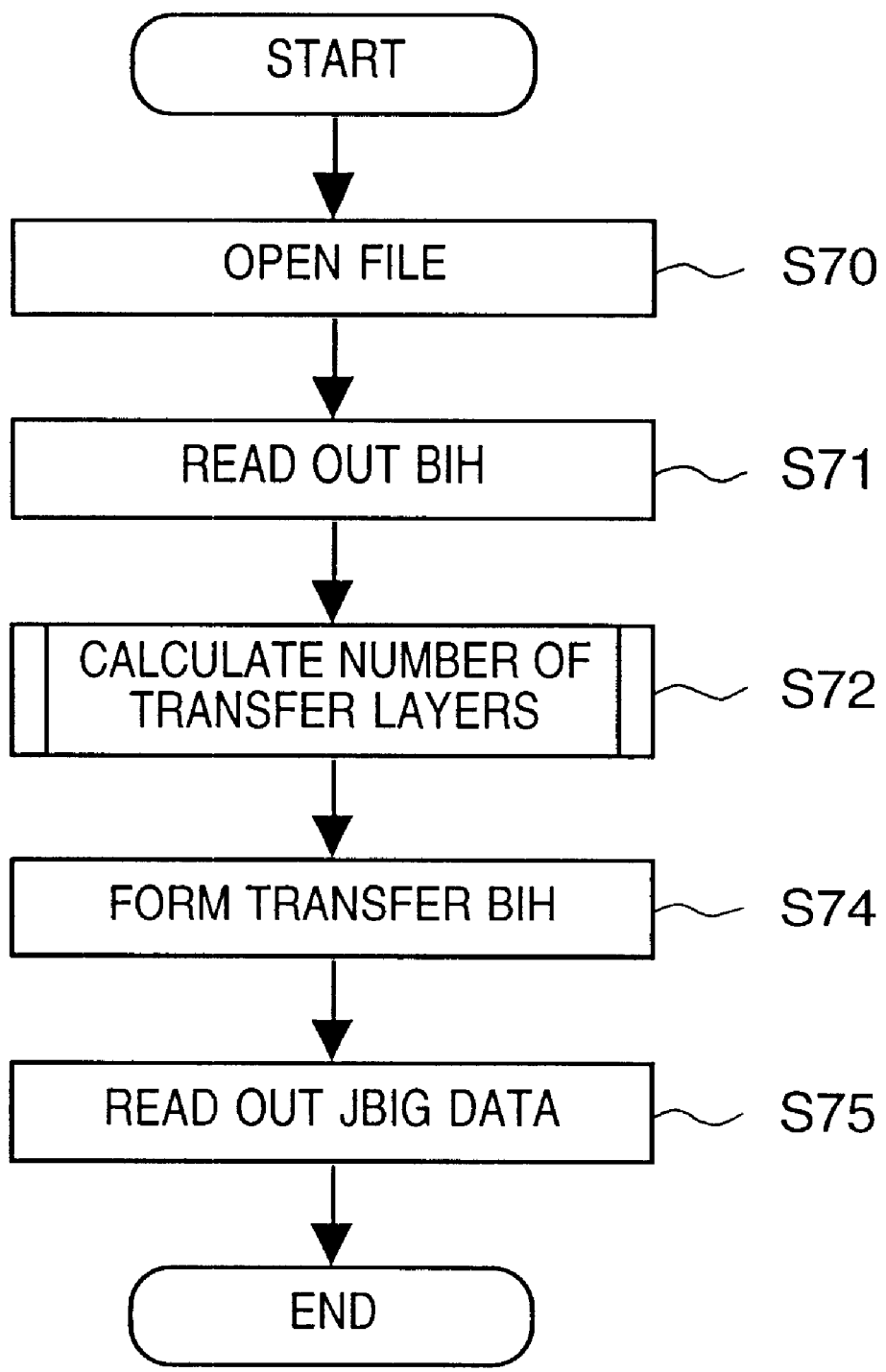
FIG. 9 is a flow chart showing a process executed by a server machine in the second embodiment of the present invention.

FIG. 9 is a flow chart showing the process executed by the server machine in the second embodiment of the present invention.

Note that data is transferred in units of packets in the network 3 connecting the server machine 1 and the client machine 4 in the second embodiment, and the data length of the packet is 4,096 bytes. Note also that the use frequency of this network 3 is low.

In step S70, the server machine 1 opens a JBIG file with a requested filename "JBIGIMGS/FILE1.JBG". Instep S71, the server machine 1 reads out the BIH of the opened JBIG file.

In step S72, the server machine 1 calculates the number of transfer layers transferable in one packet. Details of this process will be described below with reference to FIG. 10.

Figure 10:
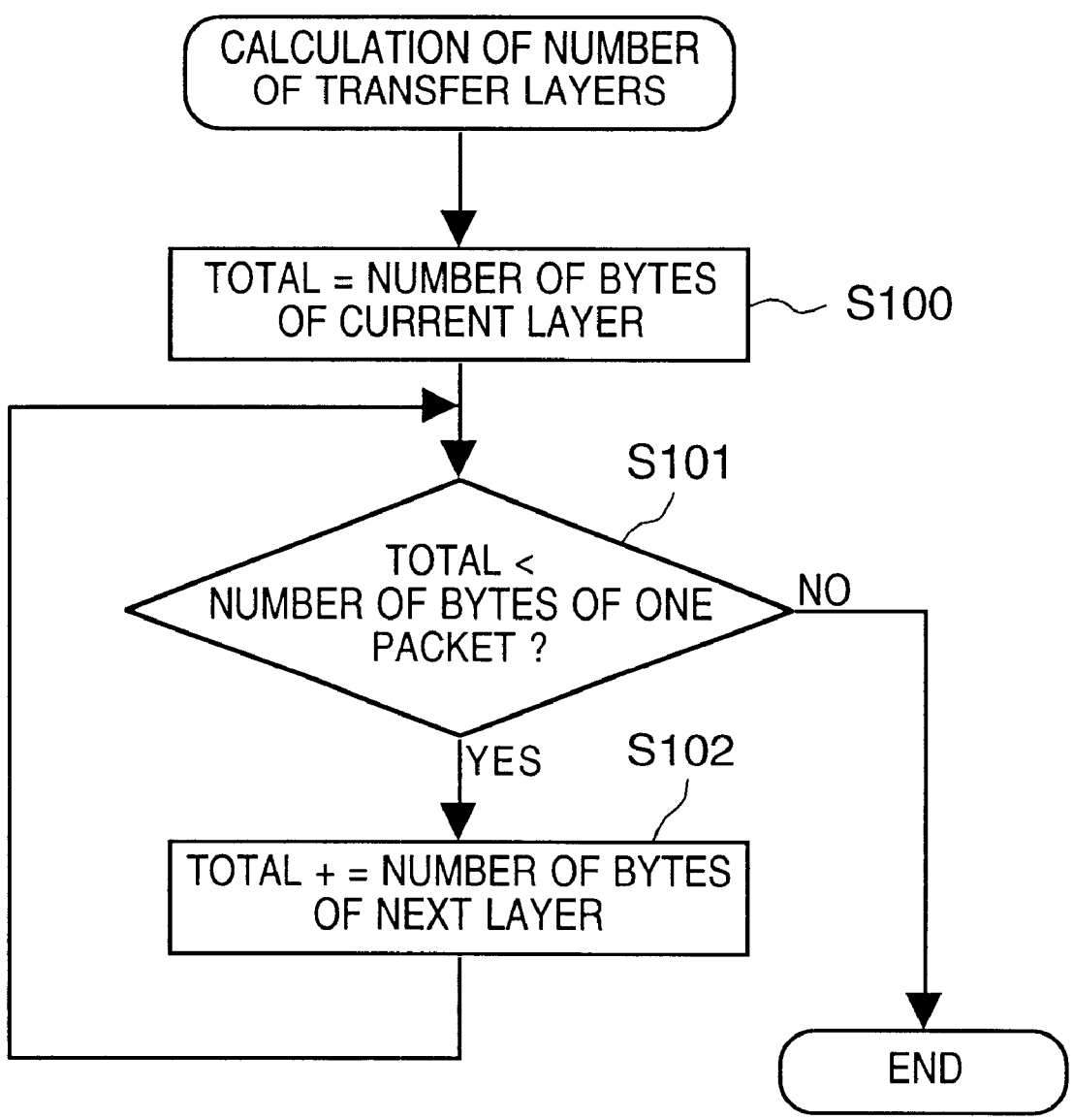
FIG. 10 is a flow chart showing details of a process of calculating the number of transfer layers in the second embodiment of the present invention.

FIG. 10 is a flow chart showing details of the process of calculating the number of transfer layers in the second embodiment of the present invention.

In step S100, the server machine 1 sets the number of bytes of JBIG data in the requested layer in a register Total (not shown). The server machine 1 also sets the layer number of the layer. In step S101, the server machine 1 checks whether the content of the register Total is smaller than the number of bytes of one packet. If the contents of the register Total are smaller than the number of bytes of one packet (YES in step S101), the flow advances to step S102. The server machine 1 calculates the number of bytes of JBIG data in the next layer and adds the number to the register Total. If the contents of the register Total are equal to or larger than the number of bytes of one packet (NO in step S101), the server machine 1 completes the process.

A practical example of this process will be described below. Assume that the number of bytes of a packet in the network 3 is 4,096 and the numbers of bytes of JBIG data in individual layers of the requested JBIG file are as shown in FIG. 11. For example, assume that the client machine 4 requests JBIG data in a layer 0. Since the number of bytes of JBIG data in the layer 0 is 1 Kbyte, the server machine 1 sets 1,024 bits (1 Kbyte) in the register Total and sets the layer number to 0 in step S100.

In step S101, the server machine 1 checks whether the contents of the register Total are smaller than the number of bytes 4,096 of one packet. Since the contents of the register Total are 1024, the flow advances to step S102. In step S102, the server machine 1 adds 1 to the layer number 0 to set a layer 1 as the next layer. The server machine 1 checks whether this layer number exceeds the total layer number of the JBIG file. If the layer number exceeds the total number of layers, the server machine 1 completes the process.

Simultaneously, the server machine 1 adds the number of bytes (1.5 Kbytes) of JBIG data in the layer 1 to the register Total. Consequently, the content of the register Total is updated to 2.5 Kbytes (2,560 bits). Since the contents of the register Total are smaller than the number of bytes of one packet, the server machine 1 executes the above process to the next layer.

When the number of bytes (2 Kbytes) of JBIG data in a layer 2 is added to the register Total, the contents of the register Total exceed the number of bytes (4,096 bytes) of one packet. Therefore, the server machine 1 completes the process.

In this example as described above, JBIG data in the layers 0 and 1 can be transferred by one packet. The layer number at this time changes from 0 to 1.

FIG. 9 will be again explained below.

In step S74, the server machine 1 forms a transfer BIH to be transferred to the client machine 4. In step S75, on the basis of the calculation result in step S73, the server machine 1 reads out JBIG data in layers transferable by one packet and transmits the read out data JBIG together with the transfer BIH to the client machine 4. A process executed by the client machine 4 is the same as the process explained with reference to FIG. 7 in the first embodiment, so a detailed description thereof will be omitted.

Figure 8:
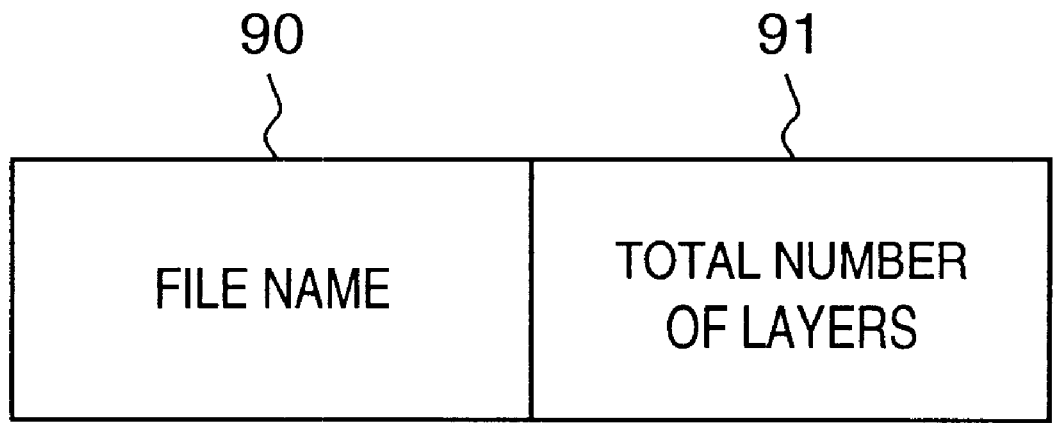
FIG. 8 is a view showing an example of a management table in the second embodiment of the present invention.

On the basis of the management table on the client machine 4 shown in FIG. 8 and the already received JBIG file, the above process is performed to request a necessary JBIG file from the server machine 1 and receive JBIG data in all layers. Consequently, a complete JBIG file constituted by JBIG data in all layers can be formed on the client machine 4. Also, even if only a JBIG file to an intermediate layer is received, this file can be processed as a JBIG file up to that layer. The received JBIG file can be displayed by decode/display application software supporting JBIG file display.

In the second embodiment as described above, only JBIG data in necessary layers is transferred between the server machine 1 and the client machine 4. In addition, it is possible to store a JBIG file in a format easily decodable on the client machine 4 and store a newly received JBIG file by appending the file to the already stored JBIG file. Therefore, even when a JBIG file once received from the server machine 1 is again required on the client machine 4, it is unnecessary to again request the JBIG file from the server machine 1 because the file is stored in the client machine 4. Consequently, it is possible to minimize the data amount flowing on the network 3 and search for and display images without increasing the traffic of the network 3.

Furthermore, if the network 3 has a high transfer capacity and a low use frequency, a plurality of JBIG data including requested layers can be transferred at once. This further decreases the traffic of the network 3. Since it is only necessary to perform this process in the server machine 1, no specifications of the client machine 4 need to be changed.

<Third Embodiment>

In the second embodiment, processes executed by a server machine 1 and a client machine 4 when the use frequency of a network 3 is low are explained. In the third embodiment, processes executed by the server machine 1 and the client machine 4 when the network 3 has a high use frequency or a low transfer capacity will be described below.

A method of checking whether the use frequency of the network 3 is high is not particularly limited. Therefore, it is of course possible to use any known method.

The process executed by the server machine 1 in the third embodiment will be described below with reference to FIG. 12. As the process executed by the client machine 4, it is only necessary to execute the process explained in FIG. 7 with respect to the process executed by the server machine 1 in accordance with FIG. 12. Therefore, the process executed by the client machine 4 will be omitted.

Figure 12:
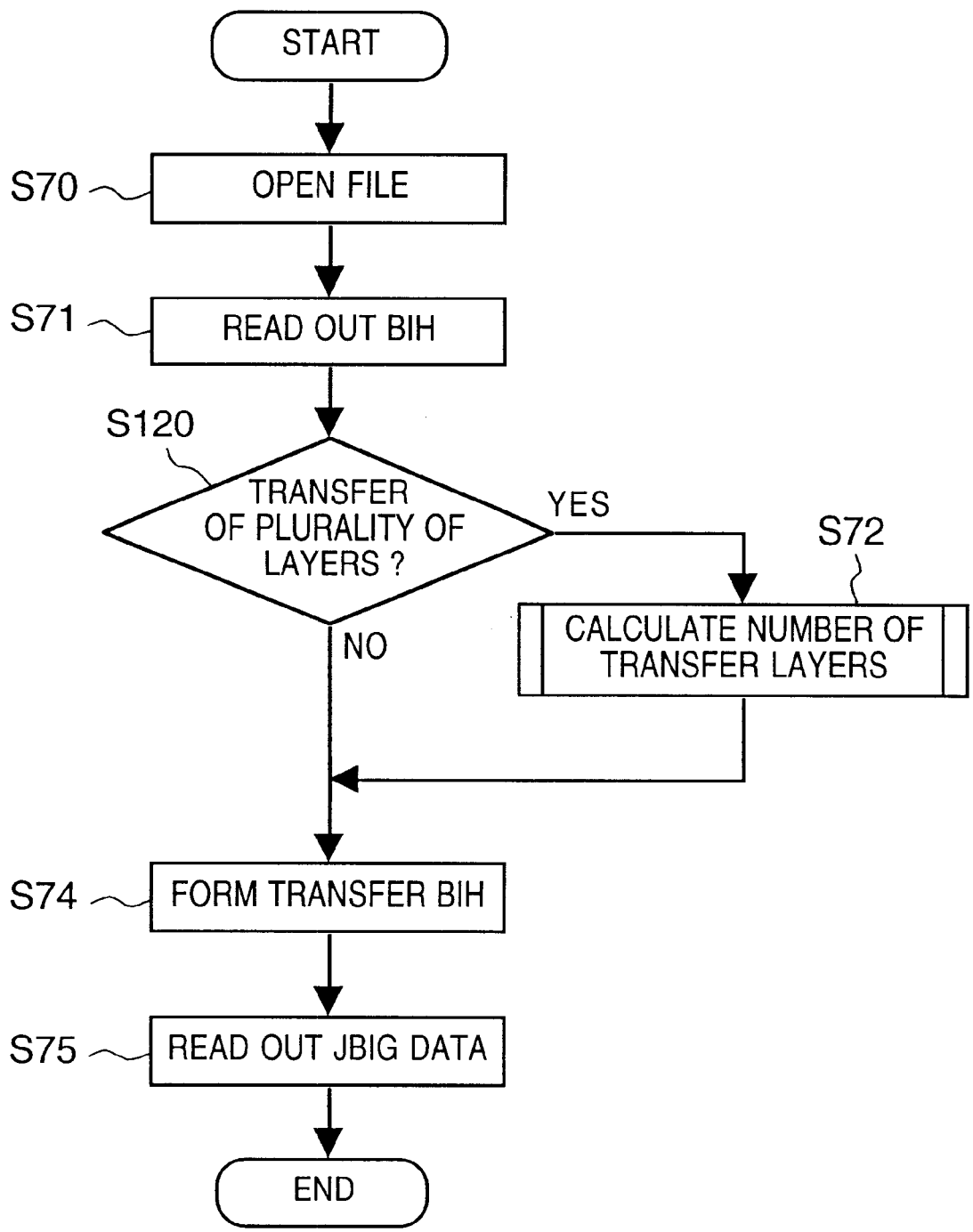
FIG. 12 is a flow chart showing a process executed by the server machine in the second embodiment of the present invention.

FIG. 12 is a flow chart showing the process executed by the server machine in the third embodiment of the present invention.

In the flowchart shown in FIG. 12, the same step numbers denote the same processes as in the flow chart shown in FIG. 9, and a detailed description thereof will be omitted. The difference from the second embodiment is that the process in step S72 of the flow chart in FIG. 9 is dynamically switched.

That is, in step S120, the server machine 1 checks whether JBIG data in a plurality of layers is to be transferred to the client machine 4. If JBIG data in a plurality of layers is to be transferred (YES in step S120), the flow advances to step S72. If no JBIG data in a plurality of layers is to be transferred (NO in step S120), the flow advances to step S74, and only JBIG data in a requested layer is transmitted to the client machine 4.

In the third embodiment as described above, the number of transfer layers is determined in accordance with the use frequency or the transfer capacity of the network 3. Therefore, even if the use frequency of the network 3 is high or its transfer capacity is low, a JBIG file in an optimum number of transfer layers can be exchanged between the server machine 1 and the client machine 4.

Note that the determination conditions in step S120 are not limited to those explained in the third embodiment, and some other conditions can also be used.

<Fourth Embodiment>

In the second and third embodiments, processes executed by one server machine 1 and one client machine 4 are explained. In the fourth embodiment, processes executed by a server machine and a client machine when a plurality of server machines and a plurality of client machines exist will be described.

The process executed by a server machine is not particularly changed. That is, it is only necessary to transmit a JBIG file to a client machine requesting the file.

Figure 13:
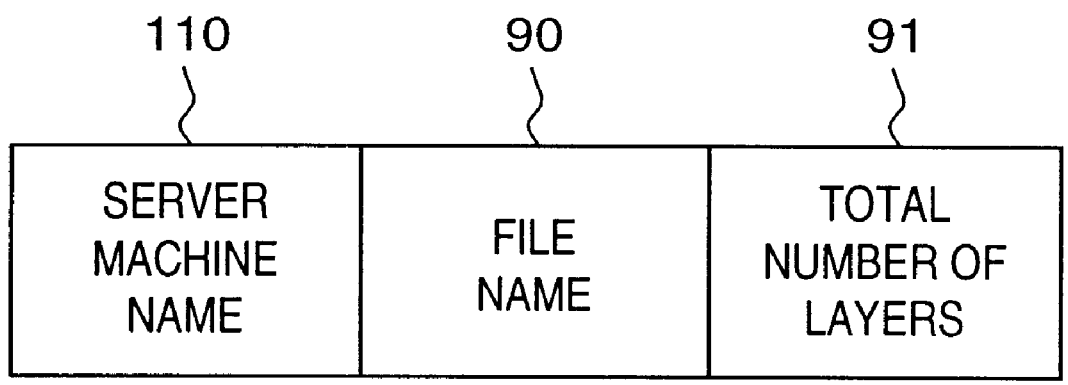
FIG. 13 is a view showing an example of a management table in the third embodiment of the present invention.

On the other hand, a client machine need only manage a server machine which the client machine requests to transmit a JBIG file. For example, each client machine is given a management table as shown in FIG. 13 and executes the process explained with reference to FIG. 10 in the second embodiment. The management table shown in FIG. 13 is a table for managing a total number of layers of each JBIG file and has the same function as the management table shown in FIG. 8 in the second embodiment. The difference from FIG. 8 is that a field 110 for managing the machine name of a server machine is added. It is possible by storing the machine name of a server machine managing a corresponding JBIG file in this field 110 to manage JBIG files on a plurality of server machines.

In the fourth embodiment as described above, even when a plurality of server machines and a plurality of client machines exist, the same effects as in the second embodiment can be obtained by giving the management table shown in FIG. 13 to each client machine.

Also, each client machine manages information indicating a server machine managing JBIG data in a corresponding layer. This makes the present invention readily applicable to a system including a plurality of server machines and a plurality of client machines.

In the first to fourth embodiments described above, the HITOLO format of a JBIG file managed by a server machine is changed into the LOTOHI format by a client machine. This increases the speed of decoding on a client machine.

<Fifth Embodiment>

In the fifth embodiment, the processes explained in the first to fourth embodiments are applied to hierarchical encoded image data (to be referred to as a JPEG file hereinafter) hierarchically encoded by a JPEG progressive coding method (to be abbreviated as a JPEG method hereinafter). In this system, a disk unit 2 of a server machine 1 stores JPEG files. For the sake of convenience, encoded image data in each layer of a JPEG file will be referred to as JPEG data. JPEG data in all layers constitutes a JPEG file.

In the fifth embodiment, a client machine 4 searches for and displays a desired JPEG file from JPEG files stored in the server machine 1. An outline of the operation is as follows. First, the client machine 4 transmits a layer number in a designated JPEG file to the server machine 1. Upon receiving this transmission, the server machine 1 transmits JPEG data in the designated layer to the client machine 4. The client machine 4 decodes and displays this JPEG data. Note that the connection form between the server machine 1 and the client machine 4 is not particularly limited.

The data formats of JPEG files managed by the server machine 1 will be described below with reference to FIG. 14.

Figure 14:
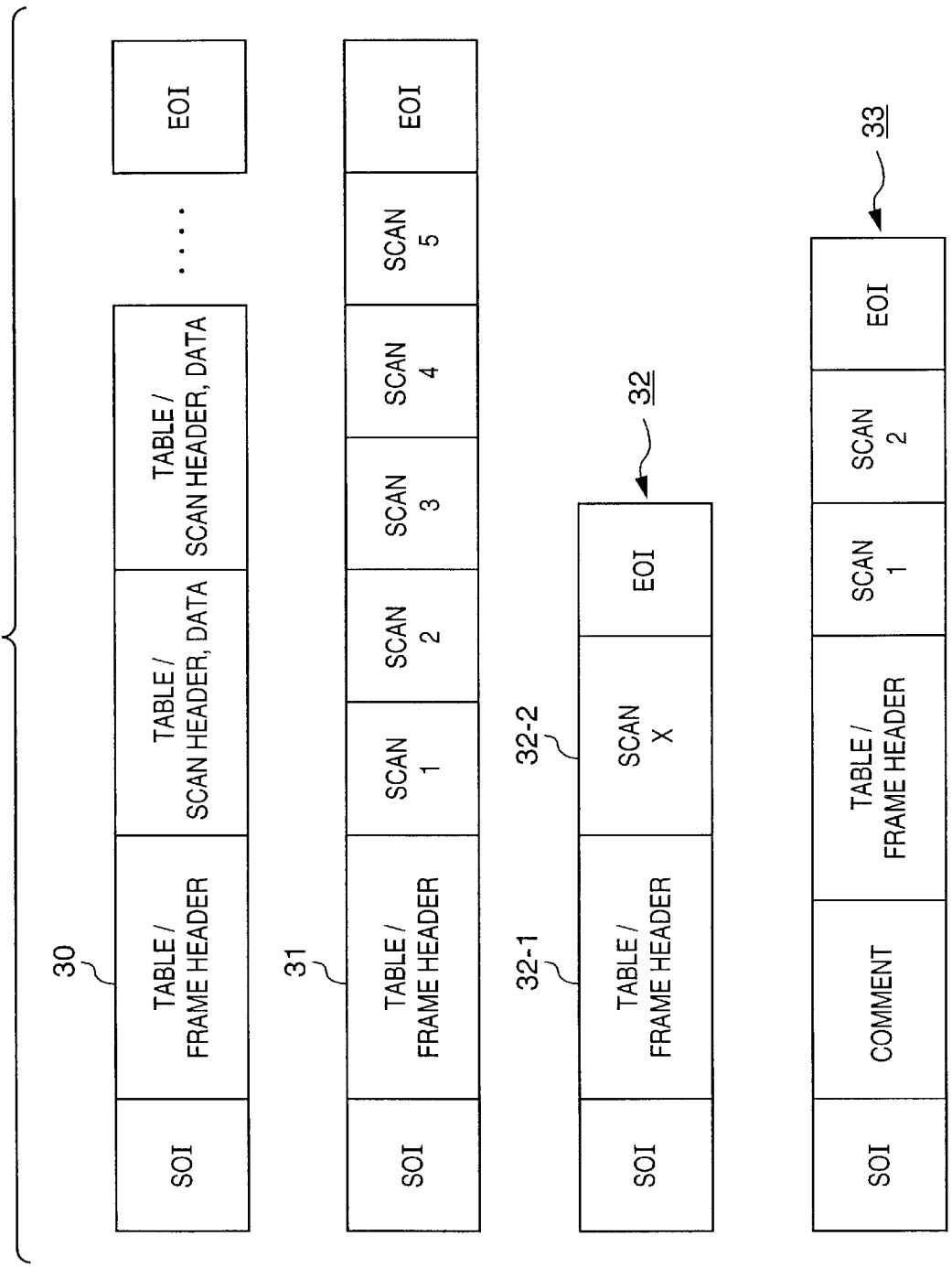
FIG. 14 is a view showing the data formats of JPEG files managed by a server machine in the fifth embodiment of the present invention.

FIG. 14 is a view showing the data formats of JPEG files managed by the server machine in the fifth embodiment of the present invention.

In FIG. 14, reference numeral 30 denotes a JPEG file with a general format; and 31, an example of a JPEG file with a format used in the fifth embodiment. In this example, a JPEG file has a hierarchical structure divided into five scans SCAN 1 to SCAN 5. In the fifth embodiment, assume that JPEG files managed by the server machine 1 have the format 31 for the sake of simplicity.

In the above environment, the client machine 4 searches for and displays a JPEG file in the following manner. First, the client machine 4 requests the server machine 1 to transmit JPEG data in the lowermost layer of a JPEG file with a file name "A.JPG". Note that a JPEG file does not contain information such as the number of scans. Therefore, the client machine 4 must check whether there is JPEG data to be decoded into an image with higher resolution.

Figure 15:
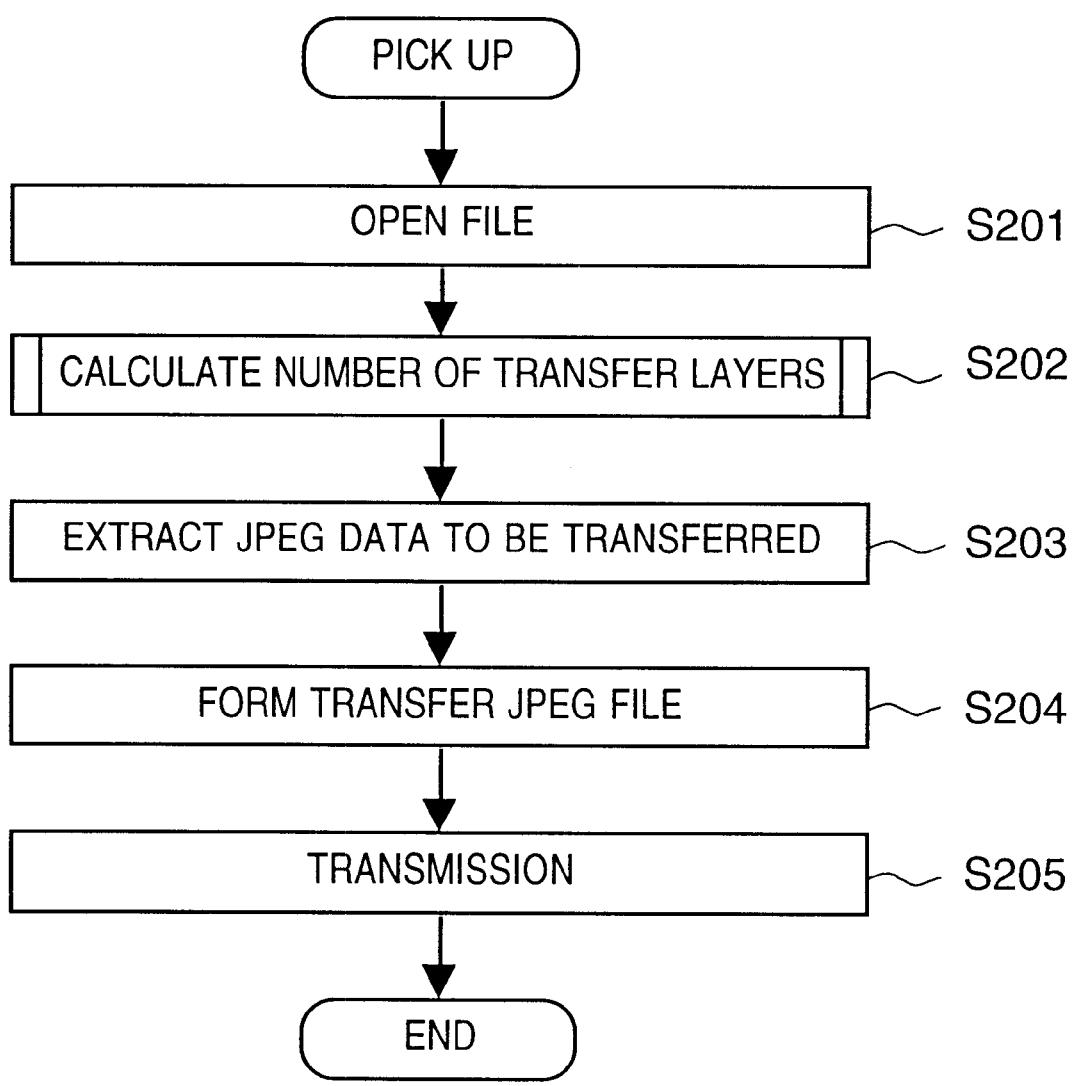
FIG. 15 is a flow chart showing a process executed by the server machine in the fifth embodiment of the present invention.

Upon receiving the request from the client machine 4, the server machine 1 forms a transfer JPEG file and transmits the file to the client machine 4 in accordance with a flow chart shown in FIG. 15.

The client machine 4 decodes and displays the received JPEG data. If the client machine 4 intends to display JPEG data with a higher resolution, the client machine 4 requests the server machine 1 to transmit JPEG data in the next layer.

The processes executed by the server machine 1 and the client machine 4 will be described below.

[Process in Server Machine]

FIG. 15 is a flow chart showing the process executed by the server machine in the fifth embodiment of the present invention.

Note that data is transferred in units of packets in a network 3 connecting the server machine 1 and the client machine 4 in the fifth embodiment, and the data length of the packet is 4,096 bytes. Note also that the use frequency of this network 3 is low. That is, JPEG data in a plurality of layers can be transferred.

In step S201, the server machine 1 opens a JPEG file with a file name "JPEGIMGS/FILE1.JPG" requested by the client machine 4. In step S202, the server machine 1 calculates the number of transfer layers transferable in one packet in order to transfer as many JPEG data as possible with fewer bytes than the number of bytes of one packet. Details of this process will be described below with reference to FIG. 16.

Figure 16:
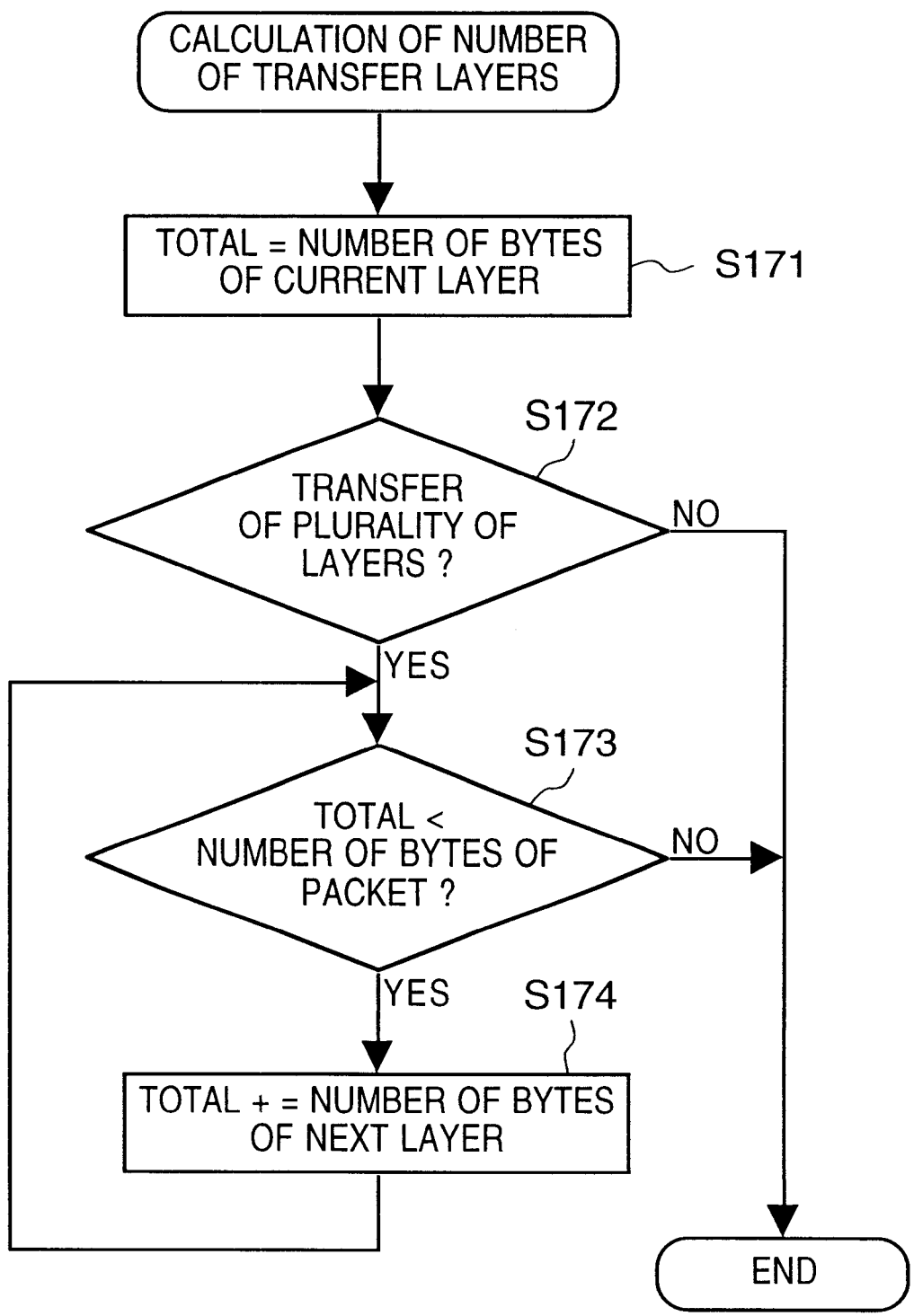
FIG. 16 is a flow chart showing details of a process of calculating the number of transfer layers in the fifth embodiment of the present invention.

FIG. 16 is a flow chart showing details of the process of calculating the number of transfer layers in the fifth embodiment of the present invention.

In step S171, the server machine 1 sets the number of bytes of JPEG data in the requested layer in a register Total (not shown). In step S172, the server machine 1 checks whether a plurality of layers are to be transferred. If no plurality of layers are to be transferred (NO in step S172), the server machine 1 completes the process. If a plurality of layers are to be transferred (YES in step S172), the flow advances to step S173.

In step S173, the server machine 1 checks whether the contents of the register Total are smaller than the number of bytes of one packet. If the contents of the register Total are smaller than the number of bytes of one packet (YES in step S173), the flow advances to step S174. The server machine 1 calculates the number of bytes in the next layer and adds the number to the register Total. If the contents of the register Total are equal to or larger than the number of bytes of one packet (NO in step S173), the server machine 1 completes the process.

A practical example of this process will be described below. Assume that the numbers of bytes of JPEG data in individual layers (scans) of the JPEG file with the file name "A.JPG" are as shown in FIG. 17. For example, if the client machine 4 requests JPEG data in SCAN 1, the server machine 1 sets the number of bytes, 3072 in the register Total in step S171. In step S172, the server machine 1 checks whether a plurality of layers are to be transferred. Since a plurality of layers are to be transferred in this example, the flow advances to step S173. In step S173, the contents (3072) of the register Total are smaller than the number of bytes, 4,096 of one packet. Therefore, the flow advances to step S174. In step S174, the server machine 1 adds the number of bytes, 512 of JPEG data in SCAN 2 as the next layer to the register Total. The resultant contents of the register Total are 3,584. The flow again returns to step S173. Since the contents (3,584) of the register Total are smaller than the number of bytes, 4,096 of one packet, the flow again advances to step S174. In step S174, the server machine 1 adds the number of bytes, 2,048 of JPEG data in SCAN 3 as the next layer to the register Total. The resultant contents of the register Total are 5,632. The flow again returns to step S173. Since the contents of the register Total are larger than the number of bytes, 4,096 of one packet, the server machine 1 completes the process. Consequently, two layers SCAN 1 and SCAN 2 can be transferred.

FIG. 15 will be again explained below.

In step S203, on the basis of the calculation result in step S202, the server machine 1 extracts JPEG data in layers transferable by one packet. For example, the numbers of offsets and bytes from the front position of each JPEG data are managed, and JPEG data is extracted on the basis of this information. Alternatively, JPEG data is extracted by dynamically finding a marker code of a scan header. That is, the method of extraction is not particularly restricted.

In step S204, the server machine 1 converts the extracted JPEG data into transfer JPEG data. One example of this transfer JPEG data is indicated by reference numeral 32 in FIG. 14. In FIG. 14, reference numeral 32-1 denotes a file header part of the transfer JPEG file. This part is essential when JPEG data in the first layer of a JPEG file is transferred and unnecessary when JPEG data in a layer other than the first layer is transferred. Reference numeral 32-2 denotes a part of actual JPEG data. In this part, the JPEG data in one or more layers extracted in step S203 is constituted. In step S205, the server machine 1 transmits the transfer JPEG file formed in step S204 to the client machine 4.

[Processes in Client Machine]

The processes executed by the client machine 4 are as follows.

(1) A process of checking, if the client machine 4 already has JPEG data to an intermediate layer, whether JPEG data in the next layer exists.

(2) A process of requesting the server machine 1 to transmit JPEG data in a new layer and receiving the data.

(3) A process of decoding and displaying the received JPEG code.

(4) A process of combining the received JPEG data with already received JPEG code.

In the JPEG coding method, process (1) can be performed by checking whether values of all DCT coefficients are obtained. Processes (2) and (3) can be accomplished by using known methods, so a detailed description of these processes will be omitted. Process (4) as the characteristic process of the present invention will be described below with reference to FIG. 18.

FIG. 18 is a flow chart showing the process executed by the client machine in the fifth embodiment of the present invention.

In step S161, the client machine 4 checks whether currently received JPEG data contains JPEG data in the first layer. If the data contains the JPEG data in the first layer (YES in step S161), the flow advances to step S162, and the client machine 4 immediately stores the data. If the data does not contain the JPEG data in the first layer (NO in step S161), the flow advances to step S163. In this fifth embodiment, the received JPEG data contains SCAN 1 and SCAN 2. Therefore, the flow advances to step S162, and the data is immediately stored. A file name used in this case is the file name requested for the server machine 1. That is, the file name "A.JPG" is used.

In step S163, the client machine 4 opens the previously stored JPEG file, i.e., the JPEG file with the file name "A.JPG". In step S164, the client machine 4 opens a currently transferred JPEG file with a file name "B.JPG". In step S165, the client machine 4 appends only a JPEG data part of the JPEG file with the file name "B.JPG" to the JPEG file with the file name "A.JPG". Thereafter, the client machine 4 closes the JPEG files with the file names "A.JPG" and "B.JPG" and erases the JPEG file with the file name "B.JPG".

By repeating the above process, JPEG data with higher resolutions are gradually added to the JPEG file with the file name "A.JPG" on the client machine 4. Finally, the same JPEG file as managed on the server machine 1 is reconstructed on the client machine 4. Also, the client machine 4 always receives a JPEG file in units of layers from the server machine 1. Therefore, even if the client machine 4 has received a JPEG file to an intermediate layer, the client machine 4 can manage the file as a JPEG file to that layer. In this manner the client machine 4 can decode and display this JPEG file.

In the fifth embodiment as described above, only JPEG data in necessary layers is transferred between the server machine 1 and the client machine 4. In addition, JPEG data is converted into a format readily decodable on the client machine 4 and at the same time stored by adding the data to a previously transferred JPEG file. Consequently, if the client machine 4 has JPEG data previously received from the server machine 1, the client machine 4 can process the JPEG data by itself. Only when JPEG data in a layer which the client machine 4 does not have is necessary, the client machine 4 requests the server machine 1 to transmit the JPEG data in the necessary layer. Consequently, image search can be performed with minimum traffic of the network 3.

Also, even when one JPEG file is separately transferred as JPEG data in units of layers, the client machine 4 can convert the data into a single JPEG file. Therefore, the client machine 4 need not process different JPEG files in units of layers, i.e., can always process a single JPEG file. This simplifies the process.

Furthermore, JPEG hierarchical encoded image data can be sequentially decoded, except for encoded image data in the first layer, even if the order of layers requested by the client machine 4 is not equal to the order of received layers due to the conditions of the network 3. This allows the client machine 4 to simply perform the JPEG file combining process.

<Sixth Embodiment>

In the fifth embodiment, processes executed by a server machine 1 and a client machine 4 when the use frequency of a network 3 is low are described. In contrast, the following process is performed if the use frequency of the network 3 is high or its transfer capacity is low. That is, the server machine 1 does not transfer a plurality of layers in step S172 of FIG. 16 in the fourth embodiment, i.e., always transfers JPEG data in units of layers. The rest of the process is the same as in the fourth embodiment. The client machine 4 need only execute the process explained with reference to FIG. 18 in the fifth embodiment for JPEG data transferred in units of layers from the server machine 1.

The method of checking whether the use frequency of the network 3 is high or its transfer capacity is low is not particularly restricted. Therefore, it is of course possible to use any known method.

In the sixth embodiment as described above, the number of transfer layers is determined in accordance with the use frequency or the transfer capacity of the network 3. Consequently, JPEG files can be transferred in accordance with the conditions of the network 3.

<Seventh Embodiment>

In the fifth and sixth embodiments, processes executed by one server machine 1 and one client machine 4 are explained. In the seventh embodiment, processes executed by a plurality of server machines and a plurality of client machines will be described.

The process executed by a server machine is not particularly changed. That is, it is only necessary to transmit a JPEG file to a client machine requesting the file.

On the other hand, a client machine need only manage a server machine which the client machine requests to transmit a JPEG file. For example, as indicated by reference numeral 33 in FIG. 14, a COMMENT marker code is provided in a JPEG file on a client machine, and information (e.g., a machine name) for identifying a server machine is stored in this code. When a client machine already has JPEG data to an intermediate layer and requests JPEG data with higher resolution, the client machine can read out the information stored in the COMMENT marker code and request JPEG data in a necessary layer from a server machine determined on the basis of the readout information.

In the seventh embodiment as described above, even when a plurality of server machines and a plurality of client machines exist, the same effects as in the fifth embodiment can be obtained by providing the COMMENT marker code in a JPEG file.

The present invention has been described by taking a JBIG file and a JPEG file as examples of image data to be processed. However, the present invention is applicable to any hierarchical encoded image data.

Also, the processes executed by the server machine 1 and the client machine 4 are not limited to those explained in the above embodiments. That is, those processes can naturally be changed in design within the range in which the present invention can be realized.

As the decoding process of application software for decoding and displaying a JBIG file or a JPEG file, any existing decoding process dedicated to a JBIG file format or a JPEG file format can be used.

Even a JBIG file or a JPEG file formed in a temporary file directory on the client machine 4 by transferring layers to an intermediate layer is reconstructed as a JBIG file or a JPEG file up to that layer. Therefore, normal display application software for a JBIG file or a JPEG file can display the reconstructed file. This allows the present invention to be used to store personal image data.

The methods of storing and naming a JBIG file or a JPEG file in the client machine 4 are not particularly restricted. Also, the temporary file directory can be either a directory set by a user or a fixed directory provided that the client machine 4 or the user can recognize the directory.

Any communication protocol can naturally be used on the network 3.

The relationship between the processes in the client machine 4 and the display/search application software for displaying and searching for a JBIG file or a JPEG file is not particularly limited.

The present invention can be applied to a system constituted by a plurality of devices (e.g., host computer, interface, reader, printer) or to an apparatus (e.g., copying machine, facsimile) comprising a single device.

Further, the object of the present invention can also be achieved by providing a storage medium storing program codes for performing the aforesaid functions according to the embodiments to a system or an apparatus, reading the program codes with a computer (e.g., CPU, MPU) of the system or apparatus from the storage medium, and then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing system comprising a server machine for managing hierarchical encoded image data, a client machine for decoding and displaying the hierarchical encoded image data, and a network for connecting said server machine and said client machine, wherein said server machine comprises:
transmitting means for transmitting encoded image data in one layer designated in units of layers from the hierarchical encoded image data to said client machine through said network, said client machine comprises:
receiving means for receiving encoded image data transmitted in units of layers from said server machine through said network; and
reconstructing means for reconstructing the encoded image data in each layer received by said receiving means into one hierarchical encoded image data, and said reconstructing means stores latest encoded image data received by said receiving means while converting the latest encoded image data into one hierarchical encoded image data by combining the latest encoded image data with previously received encoded image data.

2. The system according to claim 1, wherein said hierarchical encoded image data is hierarchically encoded by JBIG coding.

3. The system according to claim 1, wherein said reconstructing means performs code conversion to make the hierarchical encoded image data readily decodable.

4. The system according to claim 3, wherein said conversion performed by said reconstructing means is conversion into a JBIG HITOLO format.

5. The system according to claim 1, wherein even hierarchical encoded image data reconstructed up to an intermediate layer by said reconstructing means is also hierarchical encoded image data up to the intermediate layer.

6. A method of controlling an image processing system comprising a server machine for managing hierarchical encoded image data, a client machine for decoding and displaying the hierarchical encoded image data, and a network for connecting said server machine and said client machine, comprising:

a transmission step of transmitting encoded image data in one layer designated in units of layers from the hierarchical encoded image data from said server machine to said client machine through said network;

a reception step of allowing said client machine to receive encoded image data transmitted in units of layers from said server machine through said network; and a reconstruction step of reconstructing the encoded image data in each layer received in the reception step into one hierarchical encoded image data, wherein the reconstruction step stores latest encoded image data received in the reception step while converting the latest encoded image data into one hierarchical encoded image data by combining the latest encoded image data with previously received encoded image data.

7. The method according to claim 6, wherein said hierarchical encoded image data is hierarchically encoded by JBIG coding.

8. The method according to claim 6, wherein said reconstruction step comprises performing code conversion to make the hierarchical encoded image data readily decodable.

9. The method according to claim 8, wherein said conversion performed in the reconstruction step is conversion into a JBIG HITOLO format.

10. The method according to claim 6, wherein even hierarchical encoded image data reconstructed up to an intermediate layer in the reconstruction step is also hierarchical encoded image data up to the intermediate layer.

11. A computer readable memory storing program codes for controlling an image processing system comprising a server machine for managing hierarchical encoded image data, a client machine for decoding and displaying the hierarchical encoded image data, and a network for connecting said server machine and said client machine, comprising:

a program code of the transmission step of transmitting encoded image data in one layer designated in units of layers from the hierarchical encoded image data from said server machine to said client machine through said network;

a program code of the reception step of allowing said client machine to receive encoded image data transmitted in units of layers from said server machine through said network; and a program code of the reconstruction step of reconstructing the encoded image data in each layer received in the reception step into one hierarchical encoded image data, wherein the reconstruction step stores latest encoded image data received in the reception step while converting the latest encoded image data into one hierarchical encoded image data by combining the latest encoded image data with previously received encoded image data.

12. An image processing apparatus which manages hierarchical encoded image data and is connected to a client machine for decoding and displaying the hierarchical encoded image data through a network, comprising:

receiving means for receiving, from said client machine, designation of a layer of hierarchical encoded image data as an object of transmission; and transmitting means for transmitting, to said client machine through said network, encoded image data in one layer designated in units of layers from the hierarchical encoded image data received by said receiving means.

13. An image processing apparatus which is connected to a server machine for managing hierarchical encoded image data through a network and decodes and displays the hierarchical encoded image data, comprising:

receiving means for receiving encoded image data transmitted in units of layers from said server machine through said network; and reconstructing means for reconstructing the encoded image data in each layer received by said receiving means into one hierarchical encoded image data, wherein said reconstructing means stores latest encoded image data received by said receiving means while converting the latest encoded image data into one hierarchical encoded image data by combining the latest encoded image data with previously received encoded image data.

14. A method of controlling an image processing apparatus which manages hierarchical encoded image data and is connected to a client machine for decoding and displaying the hierarchical encoded image data through a network, comprising:

a reception step of receiving, from said client machine, designation of a layer of hierarchical encoded image data as an object of transmission; and a transmission step of transmitting, to said client machine through said network, encoded image data in one layer designated in units of layers from the hierarchical encoded image data received in the reception step.

15. A method of controlling an image processing apparatus which is connected to a server machine for managing hierarchical encoded image data through a network and decodes and displays the hierarchical encoded image data, comprising:

a reception step of receiving encoded image data transmitted in units of layers from said server machine through said network; and a reconstruction step of reconstructing the encoded image data in each layer received in the reception step into one hierarchical encoded image data, wherein the reconstruction step stores latest encoded image data received in the reception step while converting the latest encoded image data into one hierarchical encoded image data by combining the latest encoded image data with previously received encoded image data.

16. A computer readable memory storing program codes for controlling an image processing apparatus which manages hierarchical encoded image data and is connected to a client machine for decoding and displaying the hierarchical encoded image data through a network, comprising:

a program code of the reception step of receiving, from said client machine, designation of a layer of hierarchical encoded image data as an object of transmission; and a program code of the transmission step of transmitting, to said client machine through said network, encoded image data in one layer designated in units of layers from the hierarchical encoded image data received in the reception step.

17. A computer readable memory storing program codes for controlling an image processing apparatus which is connected to a server machine for managing hierarchical encoded image data through a network and decodes and displays the hierarchical encoded image data, comprising:

a program code of the reception step of receiving encoded image data transmitted in units of layers from said server machine through said network; and a program code of the reconstruction step of reconstructing the encoded image data in each layer received in the reception step into one hierarchical encoded image data, wherein the reconstruction step stores latest encoded image data received in the reception step while converting the latest encoded image data into one hierarchical encoded image data by combining the latest encoded image data with previously received encoded image data.

* * * * *